United States Patent
Elliott et al.

(10) Patent No.: US 6,814,044 B2
(45) Date of Patent: Nov. 9, 2004

(54) INTEGRATED GEAR TRAIN OIL PUMP

(75) Inventors: Christopher M. Elliott, Metamora, IL (US); Michael P. Harmon, Dunlap, IL (US); Aaron J. Weber, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 26 days.

(21) Appl. No.: 10/310,299

(22) Filed: Dec. 5, 2002

(65) Prior Publication Data

US 2004/0107940 A1 Jun. 10, 2004

(51) Int. Cl.[7] .................................................. F02B 77/00
(52) U.S. Cl. .................................................. 123/198 C
(58) Field of Search .................. 123/198 C, 195 A, 123/196 R, 198 R; 184/6.28, 31

(56) References Cited

U.S. PATENT DOCUMENTS

| | | | |
|---|---|---|---|
| 1,083,329 A | | 1/1914 | Lancia |
| 1,585,731 A | | 5/1926 | Oakes |
| 1,717,814 A | * | 6/1929 | Schenck ..................... 184/6.12 |
| 2,277,270 A | | 3/1942 | Schmitter et al. |
| 2,883,001 A | | 4/1959 | Dierksen |
| 3,601,515 A | | 8/1971 | Pelizzoni |
| 4,185,717 A | | 1/1980 | Ford, Jr. et al. |
| 4,573,439 A | | 3/1986 | Kasting |
| 4,662,490 A | | 5/1987 | Yamakawa |
| 4,834,040 A | * | 5/1989 | Yoshida .................. 123/198 C |

* cited by examiner

Primary Examiner—Tony M. Argenbright
Assistant Examiner—Hyder Ali
(74) Attorney, Agent, or Firm—Steve Lundquist; J W Burrows (57) ABSTRACT

An apparatus and method for pumping oil in a machine. The apparatus and method includes a first gear drivably connected to the machine, a second gear connected to the machine such that a set of teeth located on the first gear engage a set of teeth located on the second gear, an oil inlet port located near the teeth of the first gear slightly before a point of engagement of the teeth of the first and second gears, and an oil outlet port located at the point of engagement of the teeth of the first and second gears.

12 Claims, 9 Drawing Sheets

Fig. 1.

Fig_2_

INTEGRATED GEAR TRAIN OIL PUMP

TECHNICAL FIELD

This invention relates generally to a method and apparatus for providing lubricating oil in an internal combustion engine and, more particularly, to a method and apparatus for using portions of a gear train located in an internal combustion engine to pump lubricating oil.

BACKGROUND

Internal combustion engines require lubricating oil at various locations to lubricate moving components, remove heat generated by the movement of the components, and remove particles created by the components in contact with each other. Typically, the oil is delivered to the desired locations by the use of oil pumps. Oil pumps may be any one of several types, but a very common method is to use engaging gears which gather oil into the gear teeth and then pump the oil under pressure as the teeth mesh together and rapidly push the oil out from between the teeth.

Attempts have been made in the past to use gears which exist for other purposes rather than use gears dedicated for pumping oil and located within an oil pump body. For example, attempts have been made to use a crankshaft gear in combination with a camshaft gear to pump oil as the gear teeth mesh.

U.S. Pat. No. 1,083,329, issued to Lancia, depicts one of the first known attempts to use crankshaft and camshaft gears as oil pump gears. The oil enters a sealed chamber at the location in which the gear teeth separate, travel between the teeth for a complete revolution of the gears, and exits under pressure at the location in which the teeth mesh together. A variation of this same principle is found in U.S. Pat. No. 2,883,001, issued to Dierksen.

In U.S. Pat. No. 1,585,731, Oakes discloses another variation in which oil enters at the location in which the teeth of the crankshaft and camshaft gears separate, thus providing a first aspect of an oil pump. Oil also enters at the location in which the teeth of the camshaft gear separates from the teeth of a generator gear, thus providing a second aspect of the oil pump. The total travel path of the oil includes a complete revolution of the camshaft gear, as well as complete revolutions of the crankshaft and generator gears.

In the examples described above, oil must travel virtually all the way around the gears being used. This requires that the gears be located in sealed chambers to prevent oil from leaking. Another disadvantage is that not all of the oil remains between the gear teeth during travel of the gears, thus reducing the amount of oil remaining between the teeth as they mesh. This in turn reduces the amount of oil available to be pumped to the desired parts of the engine.

The present invention is directed to overcoming one or more of the problems as set forth above.

SUMMARY OF THE INVENTION

In one aspect of the present invention an apparatus for pumping oil in a machine is disclosed. The apparatus includes a first gear drivably connected to the machine, a second gear connected to the machine such that a set of teeth located on the first gear engage a set of teeth located on the second gear, an oil inlet port located near the teeth of the first gear slightly before a point of engagement of the teeth of the first and second gears, and an oil outlet port located at the point of engagement of the teeth of the first and second gears.

In another aspect of the present invention a method for pumping oil in a machine is disclosed. The method includes the steps of providing a supply of oil to a set of teeth of a first gear drivably connected to the machine at a location slightly before a point of engagement of the teeth of the first gear with a set of teeth of a second gear, transporting the oil between the teeth of the first gear up to the point of engagement, and pumping the oil to a desired location in the machine as a function of engagement of the teeth of the first and second gears.

DETAILED DESCRIPTION

Referring to the drawings, the appended claims and the specification below, an apparatus 100 and method for pumping oil in a machine 101 is disclosed. The machine 101 may be an internal combustion engine 102 or may be some other type of machine, for example, a machine for manufacturing or performing some type of work function. For purposes of illustration, the machine 101 will hereinafter be referred to as an engine 102.

For exemplary purposes, four embodiments of the present invention are described in detail. However, the scope of the invention is not limited to the four described embodiments, but rather the four embodiments serve as mere examples of the purpose, function and scope of the invention.

Figure 1:
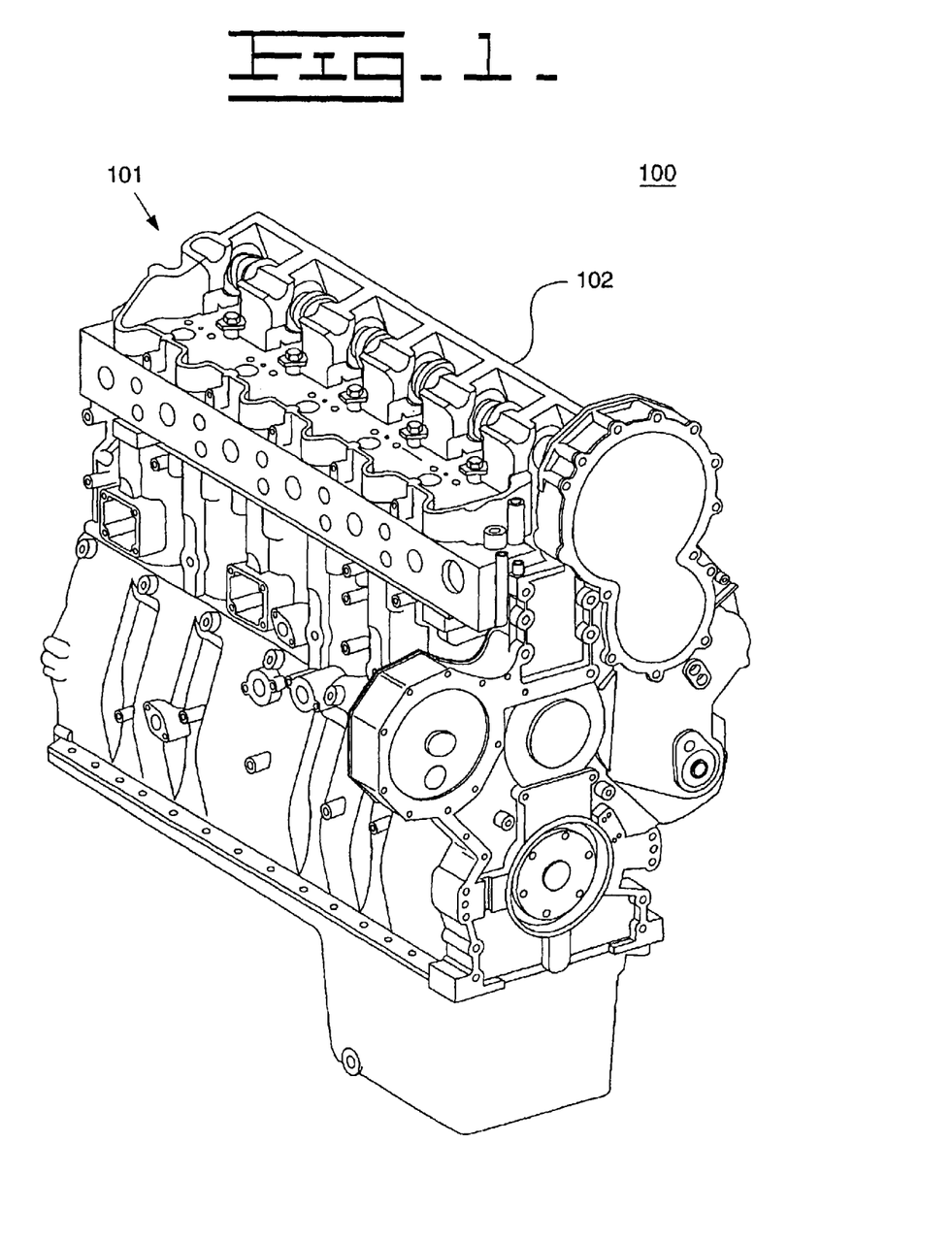
FIG. 1 is a diagrammatic illustration of an internal combustion engine.

FIG. 1 shows a typical engine 102 used for many purposes, such as providing power for transportation, electric power generation, and the like. It is well known that engines require constant lubrication to cool moving parts, reduce friction and take particles away from the surfaces of the moving parts. The need for constant lubrication requires oil to be delivered, i.e., pumped, to the moving parts.

Figure 2:
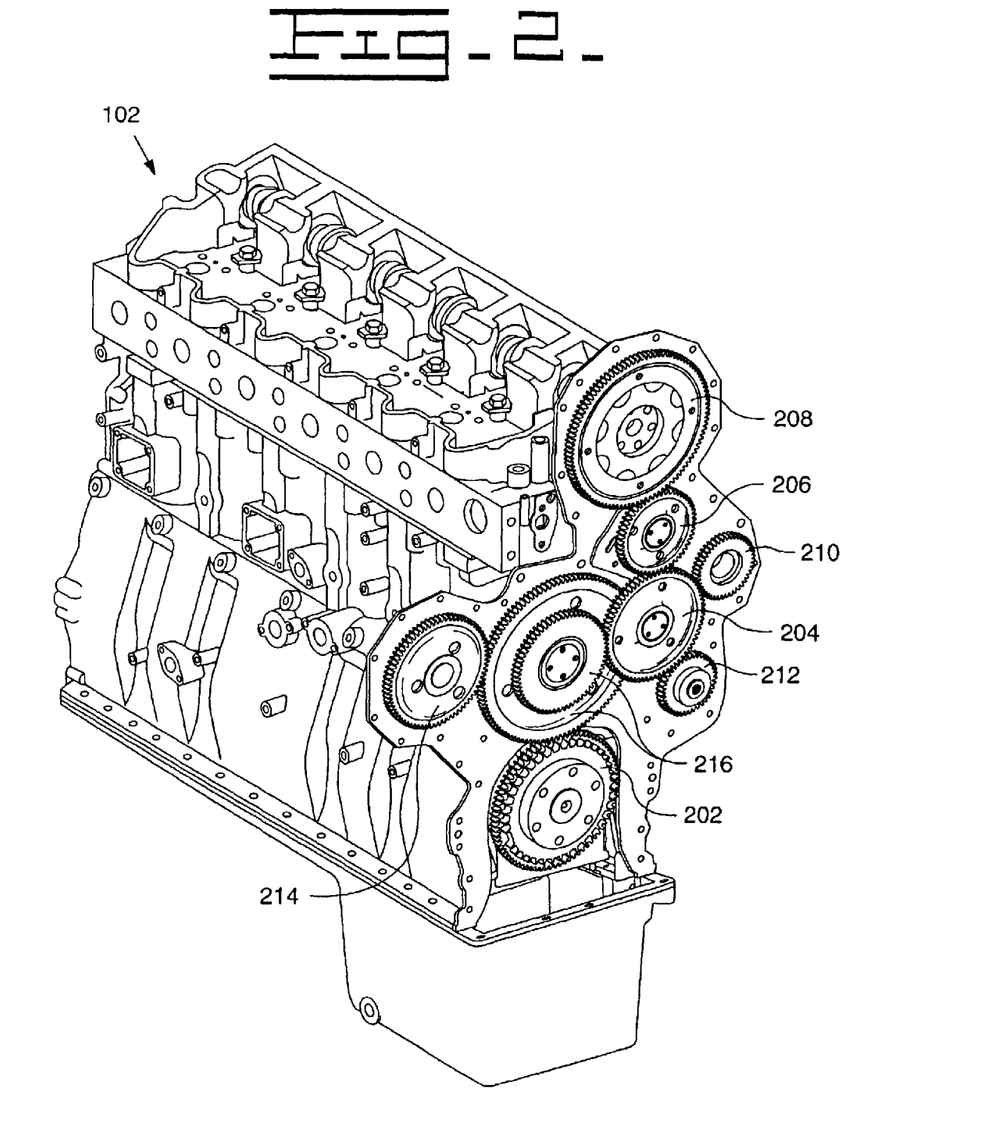
FIG. 2 is a diagrammatic illustration of a gear train located in an engine.

FIG. 2 shows the engine 102 of FIG. 1, but with a gear train exposed. In the embodiment of FIG. 2, the gear train includes a crankshaft gear 202, a first idler gear 204, a second idler gear 206, a camshaft gear 208, an air compressor gear 210, a fuel pump gear 212, a water pump gear 214 and a pair of two-plane idler gears 216. The crankshaft gear 202 is driven by the engine 102, as is well known in the art. The crankshaft gear 202 in turn may drive the two-plane idler gears 216, which in turn may drive the first idler gear 204, which may drive the second idler gear 206, which may drive the camshaft gear 208.

Furthermore, the first idler gear 204 may drive the air compressor gear 210 and the fuel pump gear 212, and one of the two-plane idler gears 216 may drive the water pump gear 214.

The gear train of FIG. 2 is but one example of a gear train for an engine. Other combinations of gear arrangements may be used. In addition, additional gears for other purposes may be added. Examples of other gear arrangements may include a camshaft gear being driven directly by a crankshaft gear, a crankshaft gear driving an idler gear which drives a camshaft gear, and the like.

Figure 3:
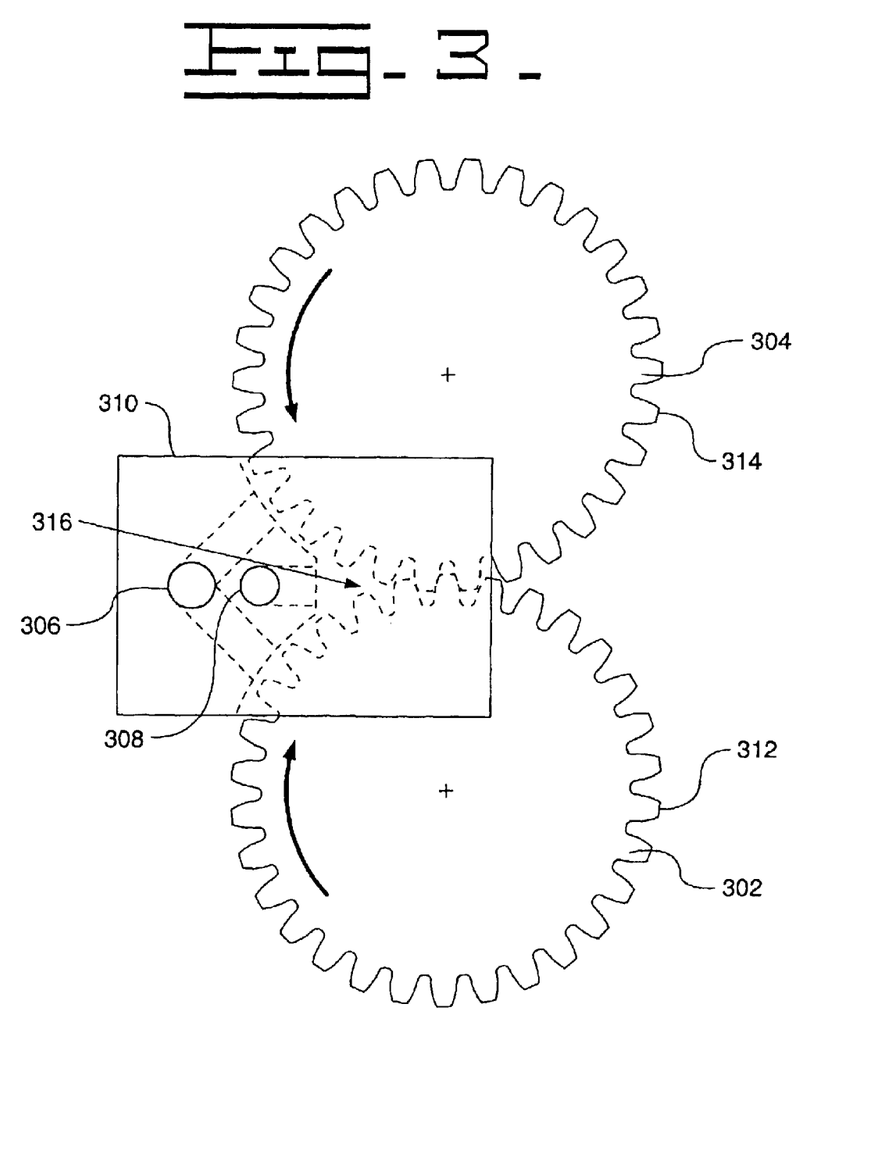
FIG. 3 is a diagrammatic illustration of a first embodiment of the present invention.
Figure 4:
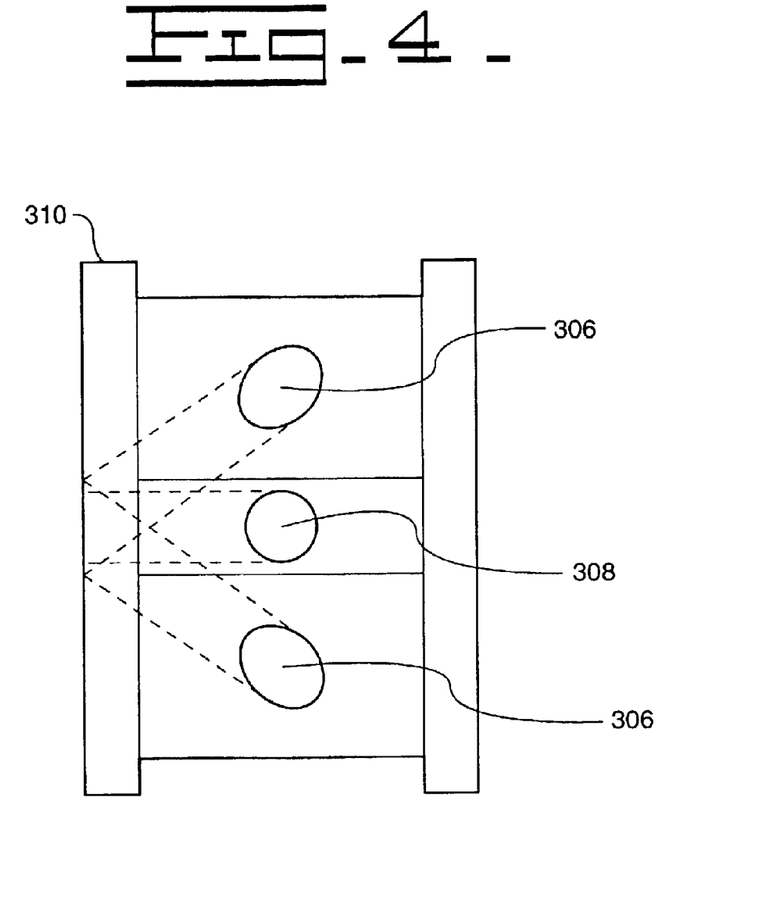
FIG. 4 is an alternate view of a portion of the embodiment of FIG. 3.

Referring to FIGS. 3 and 4, a first embodiment of the present invention is shown. A first gear 302 and a second gear 304 are engaged such that a set of teeth 312 on the first gear 302 drivably engage a set of teeth 314 on the second gear 304. The first gear 302 may be drivably connected to the engine 102, i.e., the engine 102 either directly or indirectly through additional gears drives the first gear 302. FIG. 3 shows the first gear 302 rotating in a clockwise direction and the second gear 304 responsively rotating in a counterclockwise direction, as indicated by the curved arrows. Alternatively, the first gear 302 may rotate counterclockwise and the second gear 304 may rotate clockwise.

The first gear 302 may be the crankshaft gear 202 shown in FIG. 2. The second gear 304 may then be one of the two-plane idler gears 216. Alternatively, the first gear 302 may be another gear, such as the first idler gear 204. The second gear 304 would then be the second idler gear 206. In general, the first and second gears 302,304 of FIG. 3 may be any combination of two engaged gears of FIG. 2. Alternatively, any two engaged gears in any other gear train configuration may be represented by the first and second gears 302,304 of FIG. 3. For example, the first gear 302 may be a crankshaft gear and the second gear 304 may be a camshaft gear directly engaged by the crankshaft gear.

A housing 310 encloses a portion of the first and second gears 302,304 from a point of engagement 316 of the teeth 312,314 of the first and second gears 302,304 to a location slightly before the point of engagement 316. An oil inlet port 306 is located on the housing 310 to provide a source of oil to the teeth of at least one of the first and second gears 302,304 at a location slightly before the point of engagement 316. An oil outlet port 308 is also located on the housing 310 to receive oil from the first and second gears 302,304 at the point of engagement 316.

Figure 5:
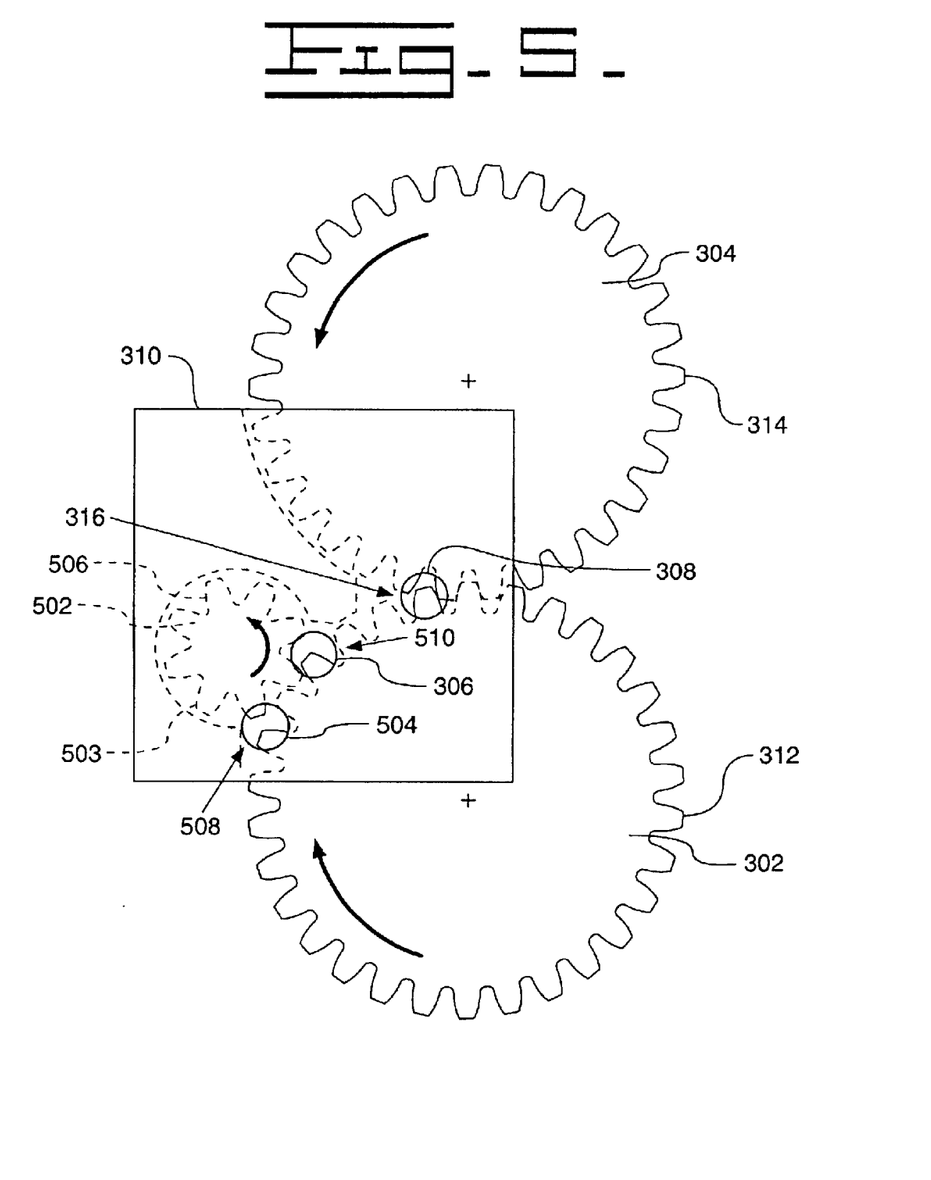
FIG. 5 is a diagrammatic illustration of a second embodiment of the present invention.

Referring to FIG. 5, a second embodiment of the present invention is shown. The second embodiment is similar to the first embodiment in that the first and second gears 302,304 are engaged, and the housing encloses a portion of the first and second gears 302,304 from a point of engagement 316 of the teeth 312,314 of the first and second gears 302,304 to a location slightly before the point of engagement 316. The FIG. 5 embodiment differs, however, in that a third gear 502 is added which has a set of teeth 506 in engaged contact with the teeth 312 of the first gear 302. An oil inlet port 306 is located on the housing 310 to provide a source of oil near a point of disengagement of the teeth 312,506 of the first and third gears 302,502. An oil outlet port 308 is located on the housing 310 to receive oil from the first and second gears 302,304 at the point of engagement 316. An other oil outlet port 504 is located on the housing 310 to receive oil from the first and third gears 302,502 at a point of engagement 508 of the teeth 312,506 of the first and third gears 302,502.

Figure 6:
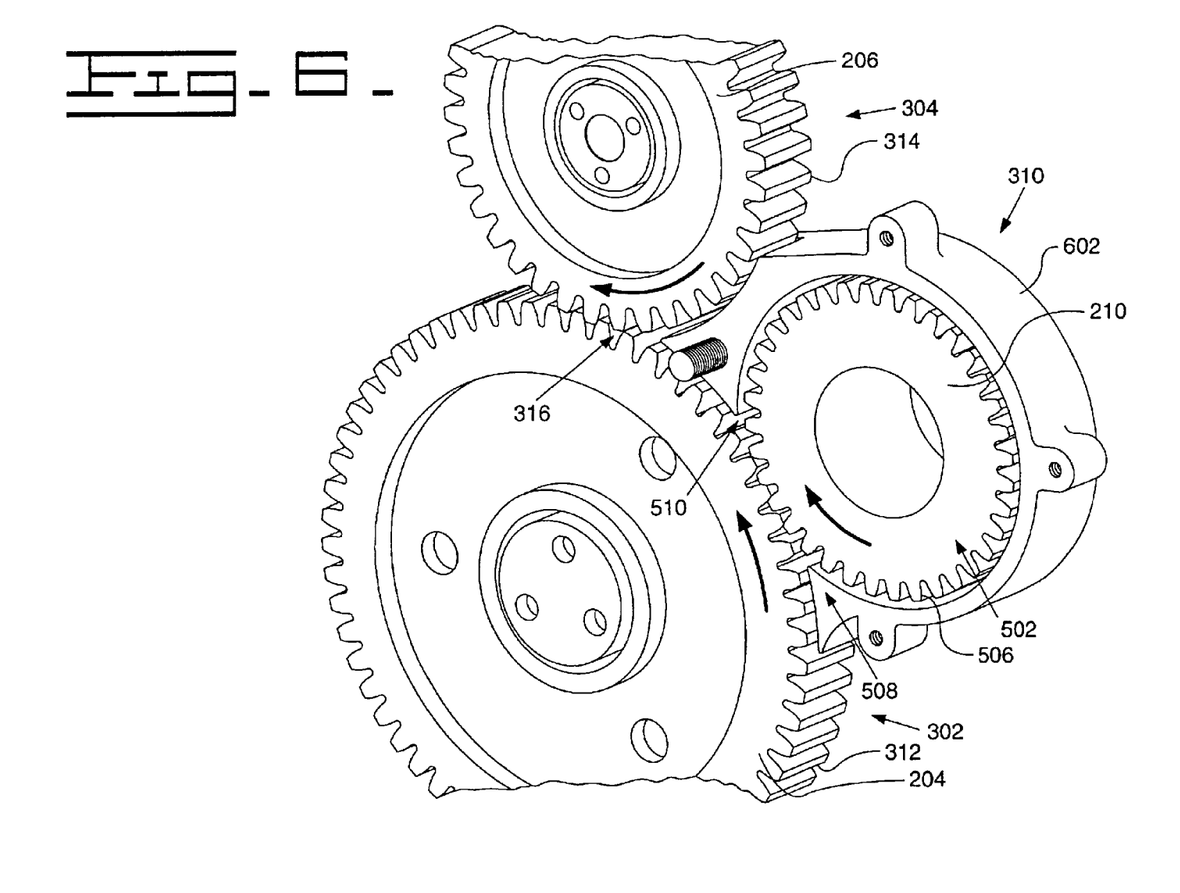
FIG. 6 is a diagrammatic illustration of a third embodiment of the present invention.
Figure 7:
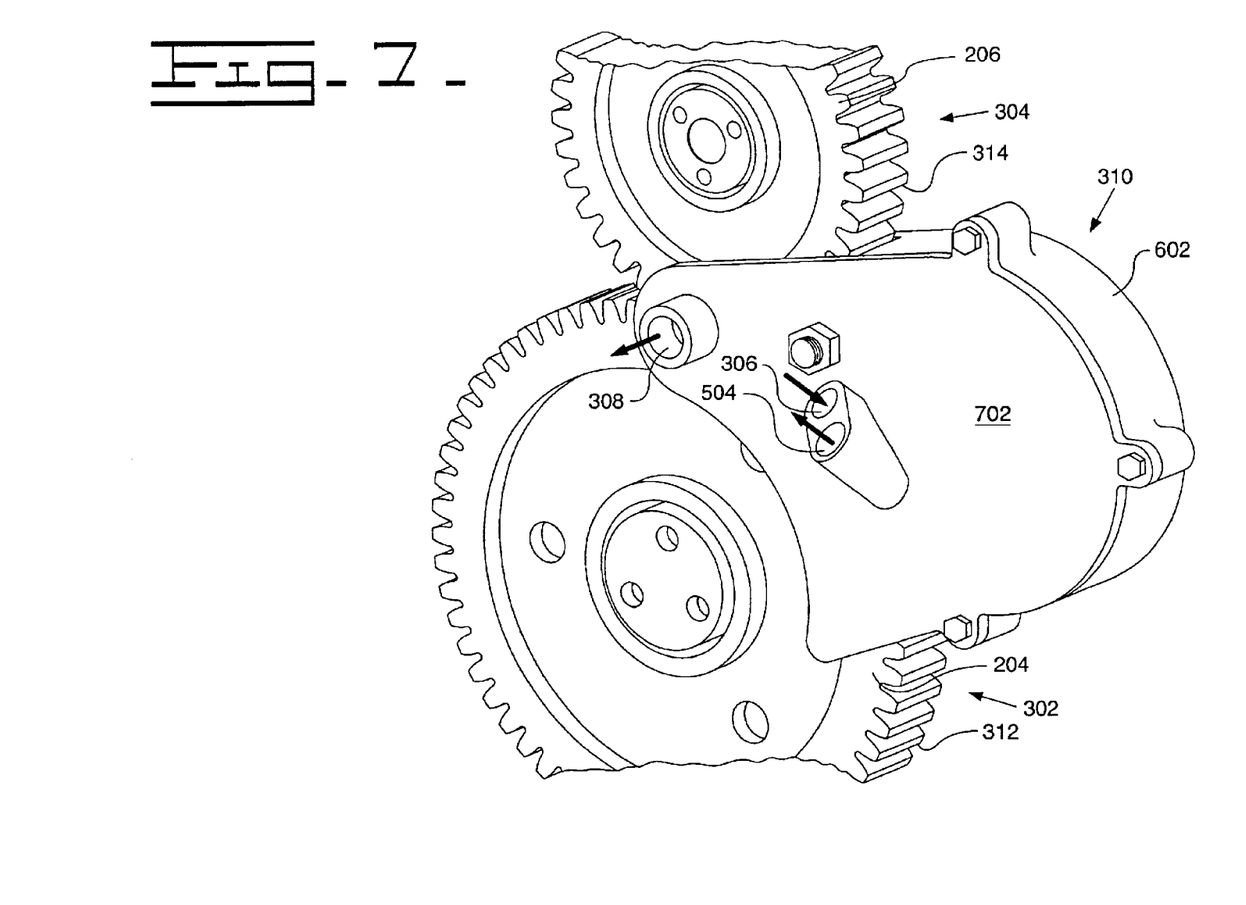
FIG. 7 is an alternate view of the embodiment of FIG. 6.

Referring to FIGS. 6 and 7, a third embodiment of the present invention is shown. FIG. 7 illustrates the third embodiment with a cover plate 702 placed over a body 602 of the housing 310. FIG. 6 illustrates the third embodiment with the cover plate 702 removed.

A first gear 302, for example the first idler gear 204 of FIG. 2, is drivably engaged to a second gear 304, e.g., the second idler gear 206. The first gear is also drivably engaged to a third gear 502, e.g., the air compressor gear 210. It is assumed for illustrative purposes that the first gear 302 rotates in a counterclockwise direction and the second and third gears 304,502 responsively rotate in clockwise directions.

An oil inlet port 306 is located on the cover plate 702 of the housing 310 to provide a supply of oil to a location near a point of disengagement 510 of the first and third gears 302,502. An oil outlet port 308 is located on the cover plate 702 to receive oil from a point of engagement 316 of the first and second gears 302,304. An other oil outlet port 504 is also located on the cover plate 702 to receive oil from a point of engagement 508 of the first and third gears 302,502.

Figure 8:
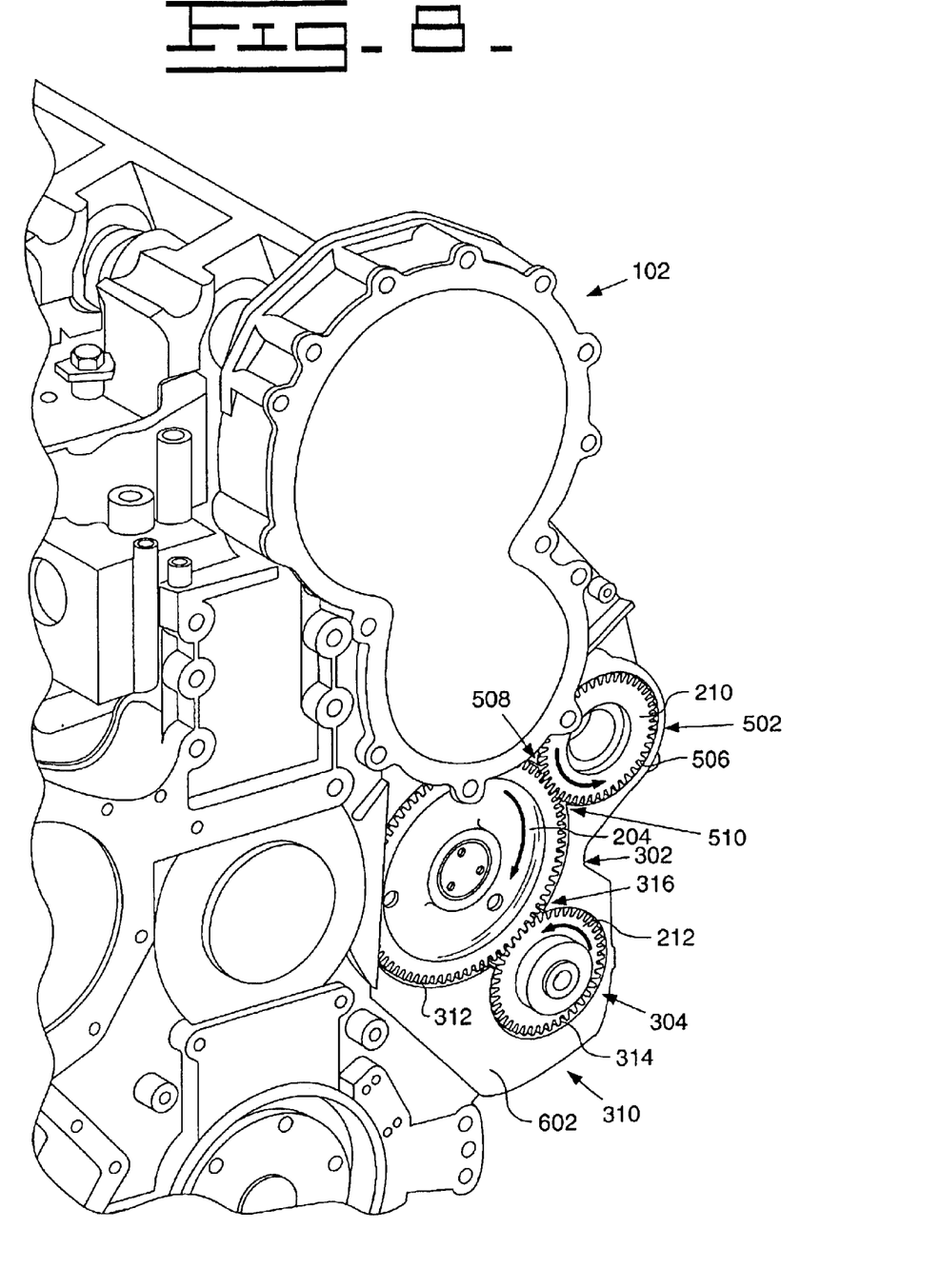
FIG. 8 is a diagrammatic illustration of a fourth embodiment of the present invention.
Figure 9:
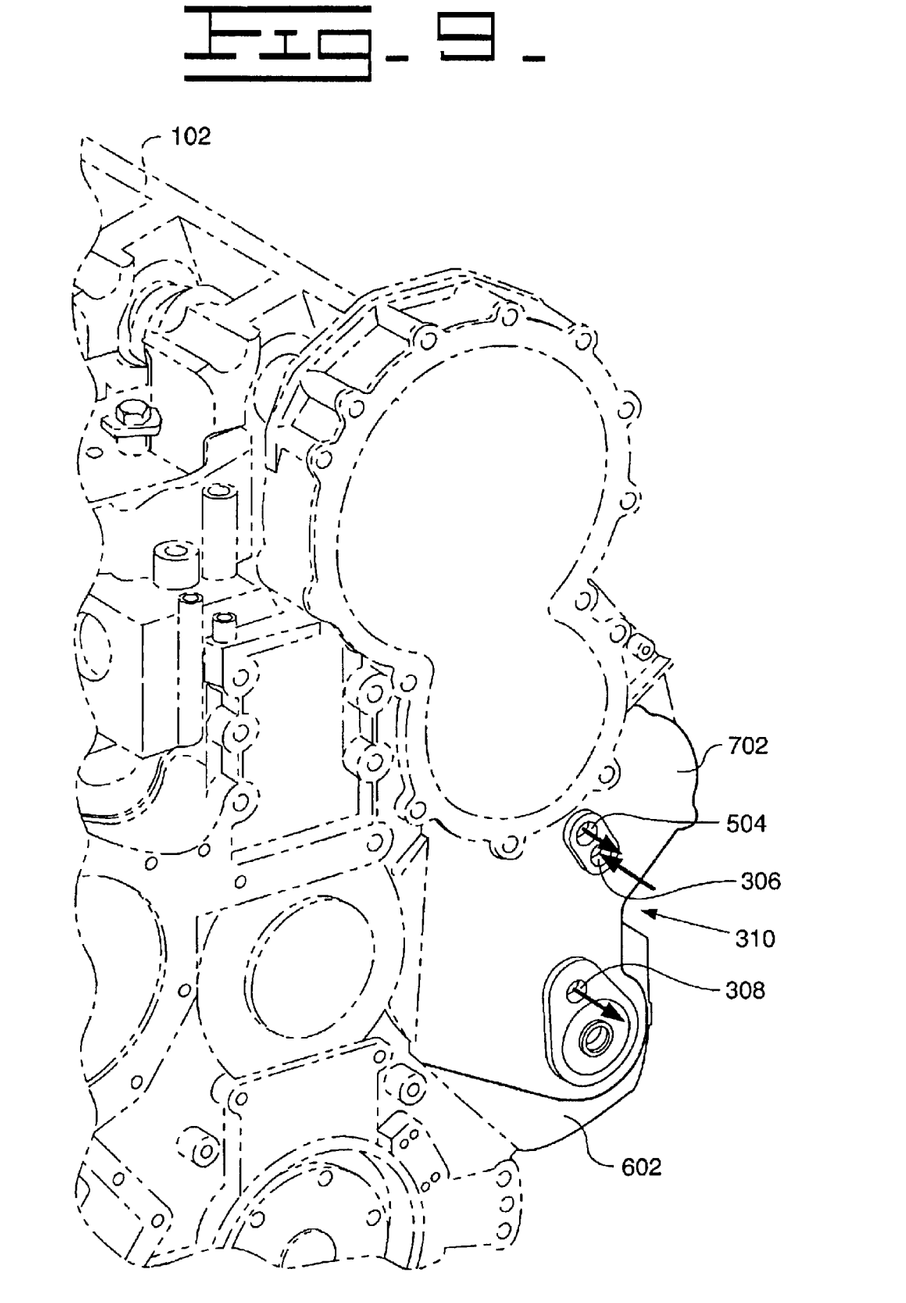
FIG. 9 is an alternate view of the embodiment of FIG. 8.

Referring to FIGS. 8 and 9, a fourth embodiment of the present invention is shown. FIG. 9 depicts a portion of an engine 102 in which a cover plate 702 is located over a body 602 of the housing 310. FIG. 8 shows the fourth embodiment with the cover plate 702 removed.

A first gear 302, for example the first idler gear 204 of FIG. 2, is drivably engaged to a second gear 304, e.g., the fuel pump gear 212. The first gear is also drivably engaged to a third gear 502, e.g., the air compressor gear 210. It is assumed for illustrative purposes that the first gear 302 rotates in a clockwise direction and the second and third gears 304,502 responsively rotate in counterclockwise directions, although the directions of rotation are the opposite of those illustrated in the third embodiment of FIG. 6.

An oil inlet port 306 is located on the cover plate 702 of the housing 310 to provide a supply of oil to a location near a point of disengagement 510 of the first and third gears 302,502. An oil outlet port 308 is located on the cover plate 702 to receive oil from a point of engagement 316 of the first and second gears 302,304. An other oil outlet port 504 is also located on the cover plate 702 to receive oil from a point of engagement 508 of the first and third gears 302,502.

INDUSTRIAL APPLICABILITY

Operation of the present invention is described with reference to each of the four embodiments shown in FIGS. 3, 5, 6 and 8. In general, oil enters from the oil inlet port 306, is captured by the teeth 312,314,506 of at least one of the first, second, and third gears 302,304,502, travels between the teeth as the gears rotate, and are forced out from the teeth at a point of engagement 316,508 through at least one of the oil outlet port 308 and the other oil outlet port 504. In each embodiment, the oil only travels a short distance between the teeth 312 of the first gear 302, i.e., the gear which drivably engages the other relevant gears. Furthermore, the housing 310 only encloses the portions of the gears which carry the oil.

In the first embodiment of FIG. 3, oil enters through the oil inlet port 306 at a location of the teeth 312,314 of the first and second gears 302,304 slightly before the teeth 312,314 engage, i.e., at the point of engagement 316. Alternatively, the oil may enter near only one set of teeth of either the first or second gears 302,304. The oil travels between the teeth 312,314 as they approach the point of engagement 316. At the point of engagement 316, the teeth 312,314 come together which forces the oil out from between the teeth 312,314. The forced-out oil is under increased pressure and exits the housing 310 through the oil outlet port 308.

In the second embodiment of FIG. 5, a third gear 502 is added such that a set of teeth 506 of the third gear 502 are drivably engaged by the teeth 312 of the first gear 302. The third gear 502 is preferably added solely for the purpose of the present invention and performs no function otherwise. Oil is introduced through the oil inlet port 306 near the point of disengagement 510 of the teeth 312,506 of the first and third gears 302,502. In particular, a portion of the oil is added to the teeth 312 of the first gear 302 and a portion of the oil is added to the teeth 506 of the third gear 502.

The portion of the oil added to the teeth 312 of the first gear 302 travels with the gear 302 to the point of engagement 316 of the first and second gears 302,304. At the point of engagement 316, the oil is forced out from the teeth 312,314 through the oil outlet port 308 under increased pressure.

The portion of the oil added to the teeth 506 of the third gear 502 travels with the gear 502 to the point of engagement 508 of the first and third gears 302,502. At the point of engagement 508, the oil is forced out from the teeth 312,506 of the first and third gears 302,502 through the other oil outlet port 504 under increased pressure.

In the third embodiment of FIG. 6, and with reference to FIG. 7 as well, the first gear 302, e.g., the first idler gear 204, drivably engages the second gear 304, e.g., the second idler gear 206, and also drivably engages the third gear 502, e.g., the air compressor gear 210.

Oil is introduced through the oil inlet port 306 near the point of disengagement 510 of the teeth 312,506 of the first and third gears 302,502. In particular, a portion of the oil is added to the teeth 312 of the first gear 302 and a portion of the oil is added to the teeth 506 of the third gear 502.

The portion of the oil added to the teeth 312 of the first gear 302 travels with the gear 302 to the point of engagement 316 of the first and second gears 302,304. At the point of engagement 316, the oil is forced out from the teeth 312,314 through the oil outlet port 308 under increased pressure.

The portion of the oil added to the teeth 506 of the third gear 502 travels with the gear 502 to the point of engagement 508 of the first and third gears 302,502. At the point of engagement 508, the oil is forced out from the teeth 312,506 of the first and third gears 302,502 through the other oil outlet port 504 under increased pressure.

In the fourth embodiment of FIG. 8, and with reference to FIG. 9 as well, the first gear 302, e.g., the first idler gear 204, drivably engages the second gear 304, e.g., the fuel pump gear 212, and also drivably engages the third gear 502, e.g., the air compressor gear 210. It is noted that, for illustrative purposes only, the rotation of the gears of the fourth embodiment of FIG. 8 is shown opposite to the rotation of the gears of the third embodiment of FIG. 6.

Oil is introduced through the oil inlet port 306 near the point of disengagement 510 of the teeth 312,506 of the first and third gears 302,502. In particular, a portion of the oil is added to the teeth 312 of the first gear 302 and a portion of the oil is added to the teeth 506 of the third gear 502.

The portion of the oil added to the teeth 312 of the first gear 302 travels with the gear 302 to the point of engagement 316 of the first and second gears 302,304. At the point of engagement 316, the oil is forced out from between the teeth 312,314 through the oil outlet port 308 under increased pressure.

The portion of the oil added to the teeth 506 of the third gear 502 travels with the gear 502 to the point of engagement 508 of the first and third gears 302,502. At the point of engagement 508, the oil is forced out from between the teeth 312,506 of the first and third gears 302,502 through the other oil outlet port 504 under increased pressure.

The increased pressure oil from the oil outlet port 308 and the other oil outlet port 504 is then pumped to one or more desired locations throughout the engine 102 to provide lubrication where desired.

Other aspects can be obtained from a study of the drawings, the disclosure, and the appended claims.

What is claimed is:

1. An apparatus for pumping oil in a machine, comprising:
   a first gear driveably connected to the machine;
   a second gear connected to the machine such that the teeth located on the first gear operatively engage the teeth located on the second gear;
   a housing operative to enclose only a portion of the first and second sears from a point of engagement between the first and second gears to a location slightly prior to the point of engagement thereof, the location slightly prior to the point of engagement is a location at which a portion of the teeth of at least one of the first and second gears is enclosed within the housing;
   an oil inlet port located in the housing and being in communication with the portion of teeth of the at least one of the first and second gears at the location slightly before the point of engagement of the teeth of the first and second gears; and
   an oil outlet port located in the housing and being in communication with the respective teeth of the first and second gears at the point of engagement thereof.

2. An apparatus, as set forth in claim 1, wherein the machine is an internal combustion engine.

3. An apparatus, as set forth in claim 2, wherein the first gear is one of a crankshaft gear and an idler gear.

4. An apparatus, as set forth in claim 3, wherein the second gear is one of an idler gear and a camshaft gear.

5. An apparatus, as set forth in claim 2, further including a third gear enclosed in the housing and having teeth thereof in engagement with the teeth of the first gear.

6. An apparatus, as set forth in claim 5, further including an other oil outlet port in the housing and the other oil outlet port being in communication with the respective teeth at the point of engagement of the teeth of the first and third gears the oil inlet port being in communication with the teeth of the third gear at a location near the point of disengagement between the first and third gears.

7. An apparatus, as set forth in claim 6, wherein the third gear is an oil pump gear.

8. An apparatus, as set forth in claim 6, wherein the third gear is one of an air compressor gear and a fuel pump gear.

9. A method for pumping oil in a machine, including the steps of:
   providing a first gear driveably connected to the machine and a second gear connected to the machine and the teeth thereof being in engagement with the teeth of the first gear;
   providing a housing to enclose only a portion of a first and second gears from the point of engagement thereof to a location slightly prior to the point of engagement, the location slightly prior to the point of engagement is a location at which a portion of the teeth of at least one of the first and second gears is enclosed within the housing;
   providing a supply of oil through the housing to the location slightly prior to the point of engagement between the first and second gears;
   transporting the oil between the teeth of the first gear up to the point of engagement; and pumping the oil from the point of engagement, through the housing, and to a desired location in the machine as a function of engagement of the teeth of the first and second gears.

10. A method, as set forth in claim 9, further including the steps of:
   providing a third gear within the housing and in engagement with the first gear;
   providing a portion of the supply of oil through the housing to a location near the point of disengagement between the first and third gears;
   transporting the oil between the teeth of the third gear up to the point of engagement with the teeth of the first gear; and
   pumping the oil from the point of engagement between the first and third gears, through the housing, and to an other desired location in the machine as a function of engagement of the teeth of the first and third gears.

11. An apparatus for pumping oil in an engine, comprising:
   a first gear drivably connected to the engine;
   a second gear connected to the engine such that a set of teeth located on the first gear engage a set of teeth located on the second gear;
   an oil inlet port located near the teeth of the first gear slightly before a point of engagement of the teeth of the first and second gears;
   an oil outlet port located at the point of engagement of the teeth of the first and second gears; and
   a housing configured to enclose only a portion of the first and second gears from the location of the oil inlet port to the location of the oil outlet port, wherein the oil inlet and oil outlet ports are located on the housing, the location of the oil inlet port is the location at which only a portion of the teeth of at least one of the first and second sears is enclosed within the housing.

12. An apparatus for pumping oil in an engine, comprising:
   a first gear drivably connected to the engine;
   a second gear connected to the engine such that a set of teeth located on the first gear engage a set of teeth located on the second gear;
   a third gear connected to the engine such that the teeth on the first gear engage a set of teeth located on the third gear;
   a housing configured to enclose only a portion of the first and second gears and all of the third gear;
   an oil inlet port located in the housing near a portion of the teeth of the first gear slightly before a point of engagement of the teeth of the first and second gears and at a point of disengagement of the teeth of the first and third gears, the location of the portion of the teeth of the first sear slightly before the point of engagement of the teeth of the first and second gears is the location at which only the portion of the teeth of the first gear is enclosed within the housing;
   an oil outlet port located in the housing at the point of engagement of the teeth of the first and second gears; and
   an other oil outlet port located in the housing at a point of engagement of the teeth of the first and third gears.

* * * * *